United States Patent [19]

Toensing

[11] Patent Number: 5,035,044
[45] Date of Patent: Jul. 30, 1991

[54] METHOD FOR REMOVING BALL STAKED HEAD GIMBAL ASSEMBLY

[75] Inventor: Eyvand E. Toensing, Savage, Minn.

[73] Assignee: Seagate Technology, Inc., Scotts Valley, Calif.

[21] Appl. No.: 640,687

[22] Filed: Jan. 14, 1991

Related U.S. Application Data

[62] Division of Ser. No. 444,622, Dec. 1, 1989, Pat. No. 5,012,367.

[51] Int. Cl.$^5$ .................................................. G11B 5/42
[52] U.S. Cl. ..................................... 29/603; 29/426.4; 29/764
[58] Field of Search ...................... 360/102, 103, 104; 29/603, 764, 426.4, 267

[56] References Cited

U.S. PATENT DOCUMENTS

| 922,096 | 5/1909 | Cunningham . | |
|---|---|---|---|
| 1,242,392 | 10/1917 | Underwood . | |
| 1,535,469 | 4/1925 | Hoffman . | |
| 2,587,139 | 2/1952 | Glover | 29/253 |
| 3,735,163 | 1/1989 | Dijkstra et al. | 310/13 |
| 4,057,886 | 11/1977 | Brass | 29/235 |
| 4,135,416 | 1/1979 | Roux | 81/5.1 R |
| 4,391,035 | 7/1983 | Van de Bult | 29/603 |
| 4,399,476 | 8/1989 | King | 360/104 |
| 4,433,463 | 2/1984 | Duval | 29/239 |
| 4,658,489 | 4/1987 | Johnston | 29/268 |
| 4,796,122 | 1/1989 | Levy et al. | 360/98.01 |
| 4,829,395 | 5/1989 | Coon et al. | 360/104 |

FOREIGN PATENT DOCUMENTS 59-21866 12/1984 Japan .

OTHER PUBLICATIONS

IBM Technical Disclosure Bulletin; vol. 18, No. 1, Jun. 1975, Ball Staking of a Transducer Assembly Mounting Block to a Positioned Arm.

Primary Examiner—Carl E. Hall
Attorney, Agent, or Firm—Kinney & Lange

[57] ABSTRACT

In a magnetic head carrying device a method and apparatus for removing a magnetic head carrying arm from a support arm wherein ball stake mounting is used to affix the magnetic head carrying arm to the support arm. A mounting plate is provided having a bevel. Tool blades may be inserted into the bevel to disassemble the ball stake mount.

4 Claims, 5 Drawing Sheets

METHOD FOR REMOVING BALL STAKED HEAD GIMBAL ASSEMBLY

This a divisional of application Ser. No. 07/444,622 filed Dec. 1, 1989 now U.S. Pat. No. 5,012,367.

BACKGROUND OF THE INVENTION

1. Field of the Invention

The present invention relates to the arm used to carry a magnetic head in a magnetic disk drive unit. In particular, the invention relates to a method of removing a ball stake mounted magnetic head from the support arm.

2. Description of the Prior Art

There has been a continual drive to increase the storage density in magnetic disk drive units. This has been achieved in part by stacking magnetic disks in a "pack" all carried within the same disk drive unit. Each side of each disk has its own associated magnetic head used for reading and writing information thereon. Each magnetic head has its own associated support arm which positions the head above the disk surface By moving the arm, the magnetic head is moved between tracks on the disk surface. A servomotor is connected to the opposite end of the support arm. The magnetic head is moved between tracks by activating the servomotor whereby the support arm pivots and the magnetic head at the opposite tip of the arm is swung between adjacent tracks on the disk surface. A linear actuator may alternatively be used to move a magnetic head. A linear actuator moves the head inward or outward on the disk along a straight line.

To further increase space savings in the disk drive unit, a single servomotor typically controls all of the support arms and their associated magnetic heads. Thus, all of the support arms are connected together and pivot about the same pivot point. This configuration is identified as an "E-block" (which refers to the shape formed by the adjacent arms and the servomotor/pivot assembly).

Each magnetic head is connected to the support arm using a mounting method known as "ball staking" or "swaging." In ball staking two pieces, a hole in one piece is aligned with a hollow tube which extends from a second piece. A rounded shape (the "ball") is forced through the hollow tube which causes the tube metal to expand and lock the two pieces together.

A problem associated with past ball stake mount designs is that there is no economical method to remove a single defective magnetic head from the assembly. Once ball stake mounted, the support structure is very difficult to disassemble and is easily damaged Thus, the entire E-block assembly must typically be replaced if a single magnetic head malfunctions.

SUMMARY OF THE INVENTION

The present invention provides a method for removing a single ball staked magnetic head from its associated support arm. Using the present invention when a single magnetic head in an E-block assembly malfunctions, it is only necessary to replace that magnetic head, without discarding the entire E-block assembly.

In the present invention, a bevel is provided between the ball staked support arm and magnetic head. Using this bevel, a removal tool may be inserted such that the ball staking is pried apart. The bevel is preferably provided by a mounting plate comprising a flat plate with a hollow metal tube which extends from its surface. This plate is preferably mounted to one of the pieces to be ball staked and ball staking occurs through the method described above. The tool used to remove the ball staked pieces is preferably a clamping assembly with two adjustable blades for prying the mount part. The blades may be formed to generally conform to the bevel A 20° bevel and corresponding blade angle is suitable.

The present invention offers significant cost advantages over the prior art because a substantially functional E-block assembly need no longer be discarded due to a single malfunctioning magnetic head. Replacement of a single head is now possible.

DETAILED DESCRIPTION OF THE PREFERRED EMBODIMENTS

Figure 1:
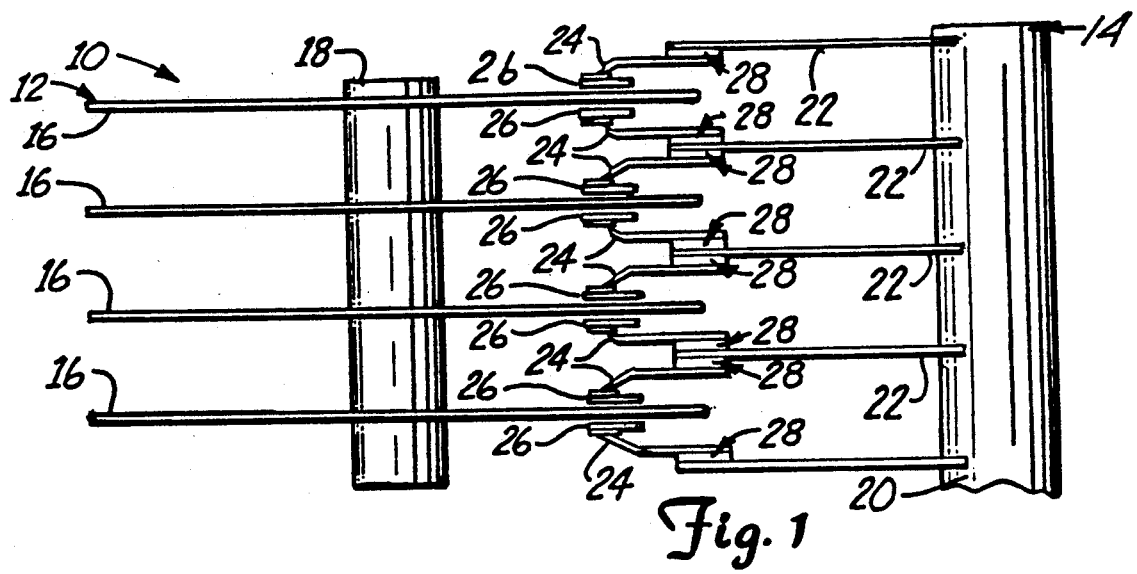
FIG. 1 shows a disk pack and its associated E-block assembly.

A disk drive assembly 10 is shown in FIG. 1 comprising a disk pack 12 and E-block assembly 14. Disk pack 12 comprises disks 16 stacked on a drive spindle 18. E-block assembly 14 comprises a servo spindle 20 and a plurality of support arms 22. Each support arm 22 carries one or two flexure arms 24. Each flexure arm 24 carries a magnetic head assembly 26. Each flexure arm 24 is mounted to its corresponding support arm 22 by ball stake mount 28. The particular method of mounting ball stake mount 28 is explained below in more detail.

Figure 2:
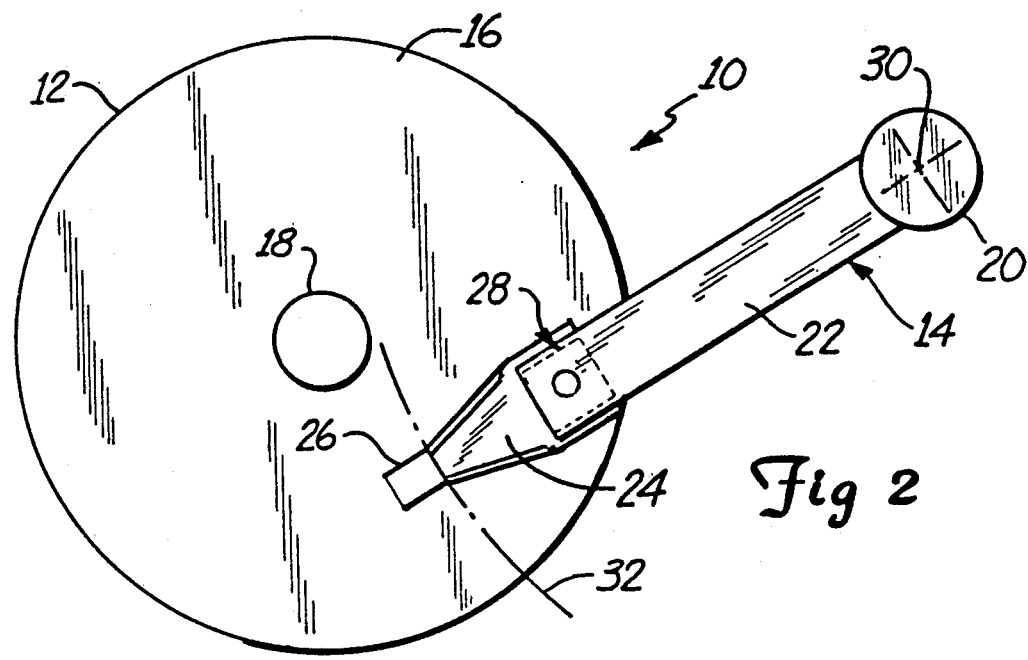
FIG. 2 is a top view of a magnetic disk and magnetic head arm.

FIG. 2 shows a top view of disk drive assembly 10 of FIG. 1. Servo spindle 20 rotates around a pivot axis 30. As servo spindle 20 rotates, magnetic head assembly 26 mounted at the tip of flexure arm 24 swings through arc 32. As disk 16 rotates beneath magnetic head 26, this pivoting motion allows magnetic head assembly 26 to change track positions on disk 16. As shown in FIG. 1, as drive spindle 18 rotates all magnetic head assemblies 26 move in unison.

Figure 3:
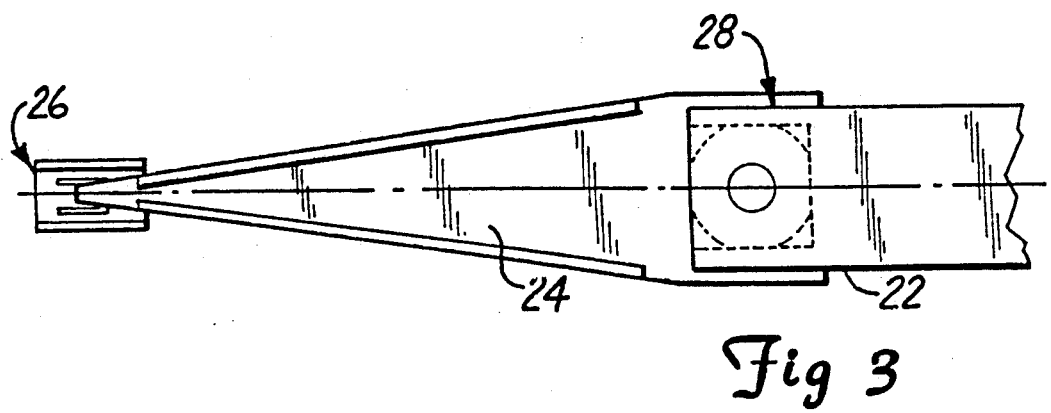
FIG. 3 is a top view of a magnetic head arm.
Figure 4:
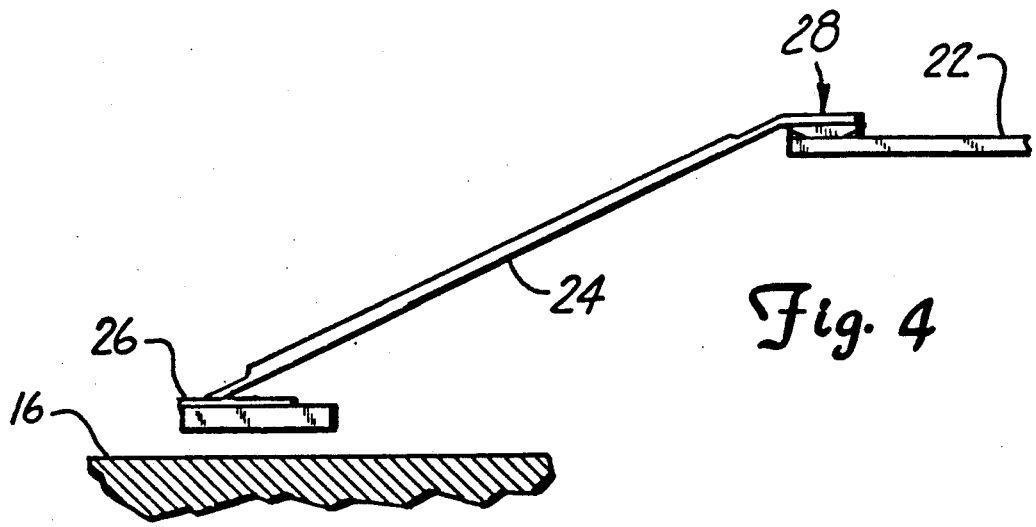
FIG. 4 is a side view of a magnetic head arm, a magnetic head assembly and a magnetic disk surface.

In FIGS. 3 and 4, a more detailed diagram of flexure arm 24 is shown. Flexure arm 24 is spring loaded, whereby magnetic head assembly 26 is held in close proximity to disk 16. As disk 16 rotates at high speed about drive spindle 18, the aerodynamic properties of magnetic head assembly 26 cause assembly 26 to "fly" above the surface of disk 16. The flying height of magnetic head assembly 26 above disk 16 is a function of the speed of rotation of disk 16, the aerodynamic lift of magnetic head assembly 26 and the spring tension in flexure arm 24.

Figure 5:
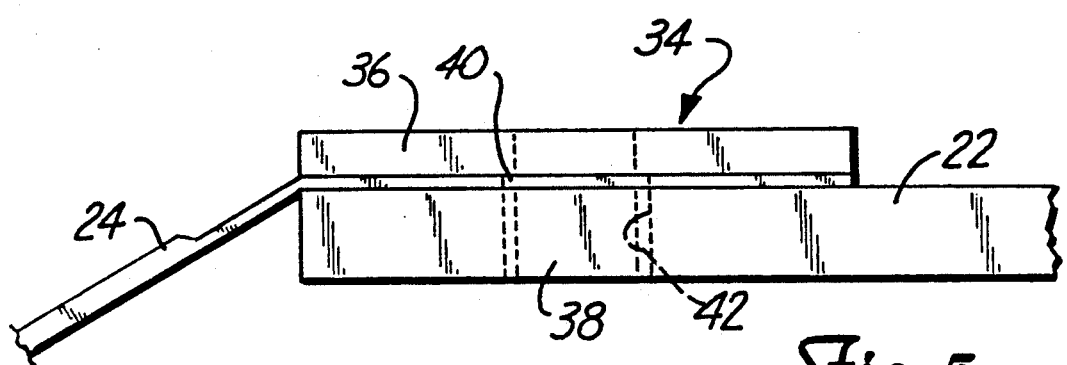
FIG. 5 is a side view of a prior art ball staked magnetic head support arm.

FIG. 5 shows a side view of a prior art ball stake mount 34. Prior art ball stake mount 34 comprises mounting plate 36, tubular member 38, hole 40 in flexure arm 24 and hole 42 in support arm 22. Tubular member 38 is hollow and comprises a malleable material such as a metal. Flexure arm 24 is mounted to support arm 22 by placing support arm 22, flexure arm 24 and mounting plate 36 as shown in FIG. 5. Mounting plate 36 is typically welded to flexure arm 24. Next, an object with a diameter larger than the diameter of tubular member 38 is forced through tubular member 38 such that the material of tubular member 38 is compressed against the edges of hole 40 in flexure arm 24 and hole 42 in support arm 22.

As discussed in the description of the prior art, it is difficult to separate flexure arm 24 from support arm 22 following the ball staking procedure. In fact, when a single magnetic head fails in E-block assembly 14 the entire E-block assembly 14 often must be discarded and replaced.

Figure 6:
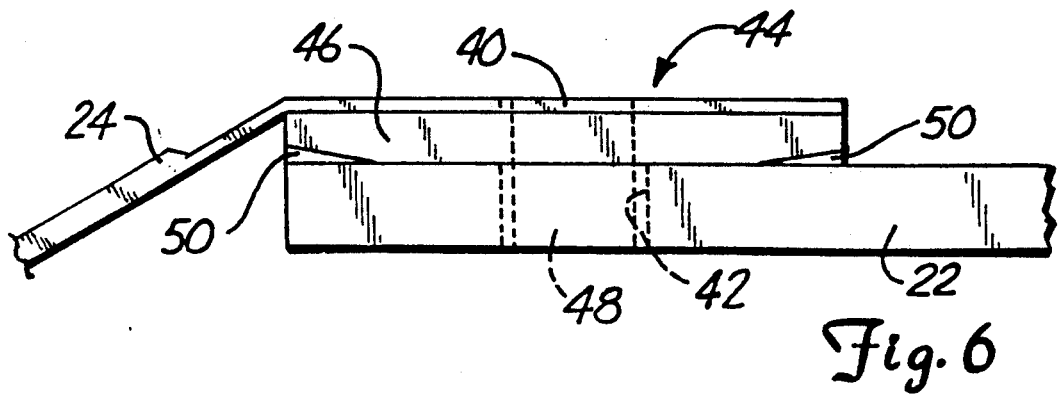
FIG. 6 is a side view of the ball staked magnetic head arm of the present invention.

FIG. 6 shows a mount in which the ball staked mount between flexure arm 24 and support arm 22 is removable in accordance with the present invention. This permits a single magnetic head assembly 26 and its corresponding flexure arm 24 to be replaced when the magnetic head carried by that magnetic head assembly 26 malfunctions. The fully functional magnetic heads in the E-block need no longer be wastefully discarded. In FIG. 6 ball stake mount 44 of the present invention is shown. Ball stake mount 44 connects support arm 22 with flexure arm 24. FIG. 6 shows a mounting plate 46 sandwiched between support arm 22 and flexure arm 24 and carries tubular member 48 extending through hole 42 and support arm 22. During manufacture mounting plate 46 is bonded to flexure arm 24 using, for example, a laser welding procedure. Mounting plate 46 of ball stake mount 44 of the present invention includes a bevel 50. Ball stake mount 44 is ball staked in the method as described above by forcing an object with a diameter larger than the diameter of tubular member 48 through hole 40 in flexure arm 24, tubular member 48 and hole 42 in support arm 22. Bevel 50 provides the means for separating support arm 22 from flexure arm 24 following ball staking.

Figure 7A:
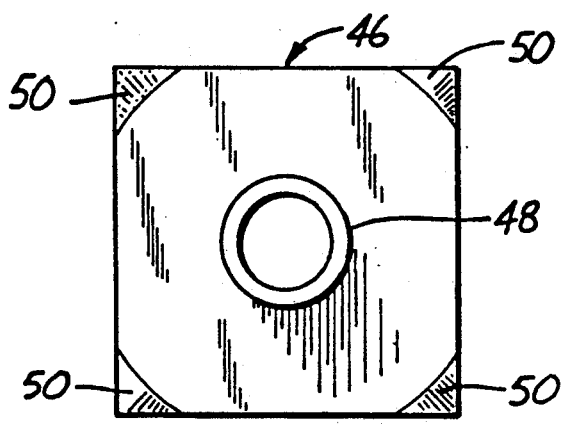
FIG. 7A is a top view of the ball stake mounting plate of the present invention.
Figure 7B:
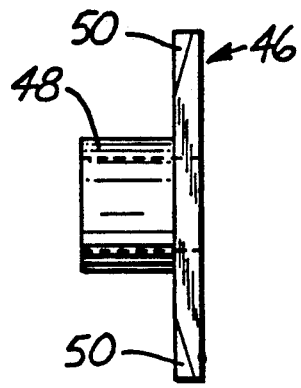
FIG. 7B is a side view of the ball stake mounting plate of the present invention.

FIGS. 7A and 7B show a more detailed view of mounting plate 46 used in the present invention. Each corner of mounting plate 46 includes bevel 50.

Figure 8:
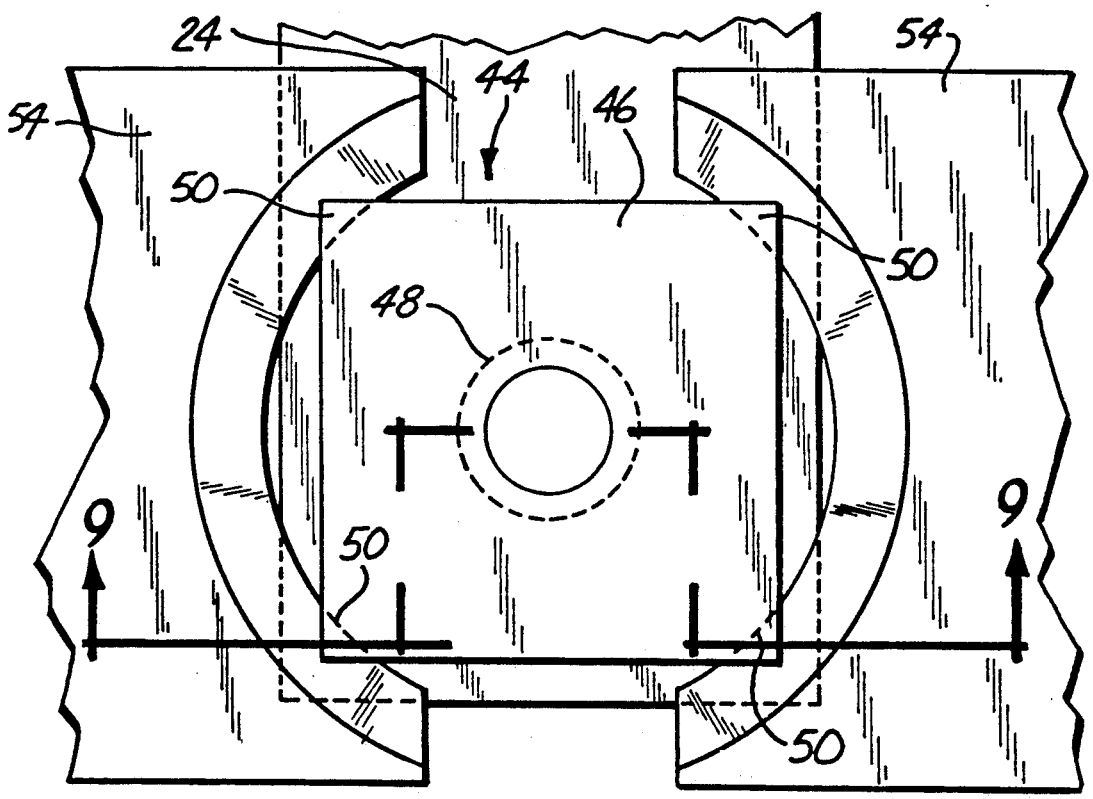
FIG. 8 shows a top view of the ball staked support arm of the present invention along with a tool used to remove the ball stake mount.
Figure 9:
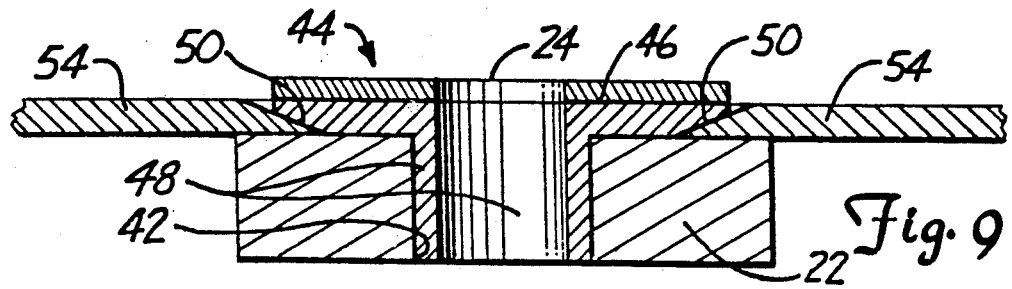
FIG. 9 is a side view of FIG. 9 showing the relationship between the removal tool and the ball stake mount.
Figure 10:
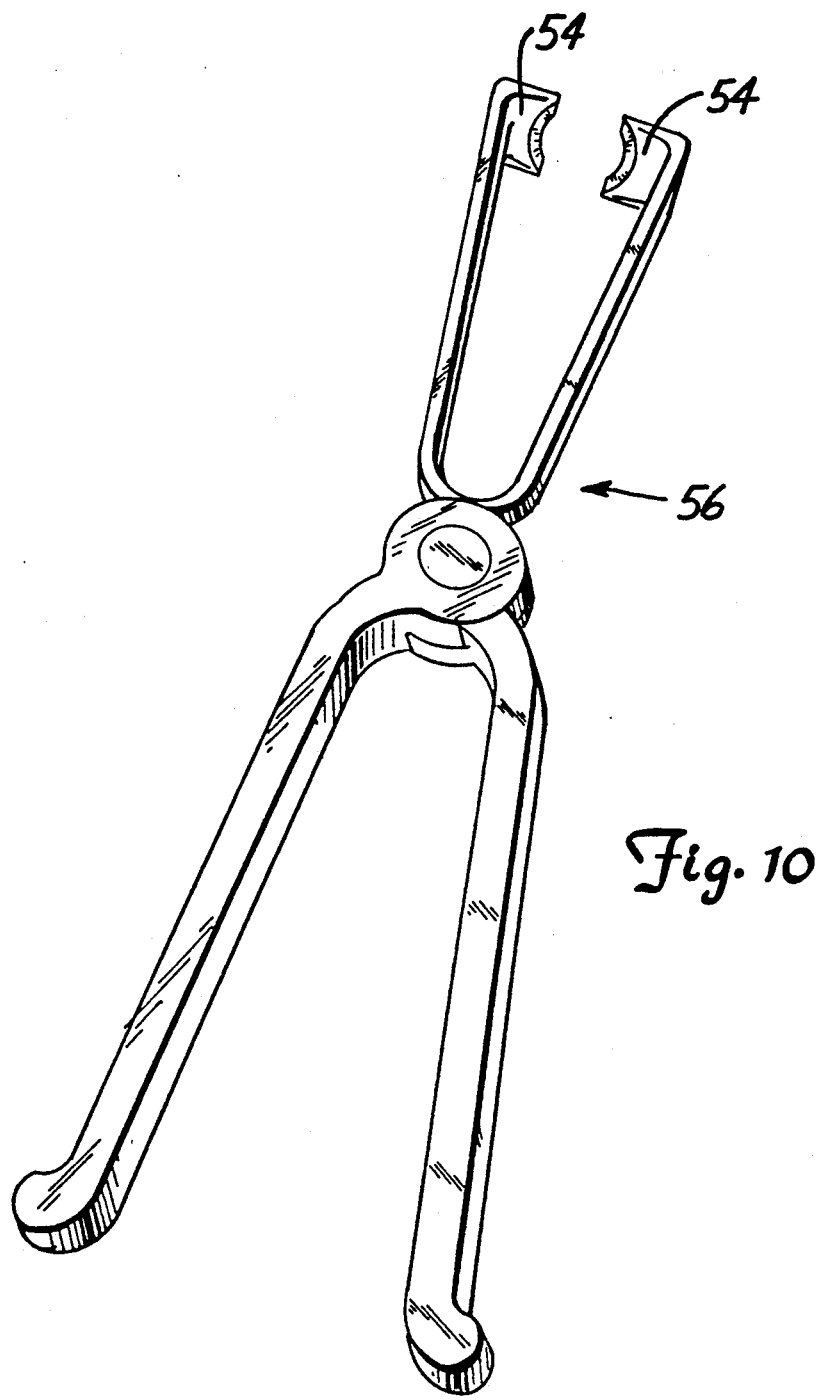
FIG. 10 shows an example of a pliers tool used to remove the ball stake mount.

FIGS. 8 and 9 show the relationship between ball stake mount 44 and removal tool 54 of the present invention. Removal tool 54 comprises two blades which approach bevels 50 from opposing sides. The blades have a blade angle generally conforming to the angle of bevel 50 so that as removal tool 54 is pressed against bevel 50, tubular member 48 is extracted from hole 42 in support arm 22. Using this removal technique, the defective magnetic head assembly 26 and its associated flexure arm 24 may be removed from support arm 22. A new flexure arm 24 carrying a functional magnetic head assembly 26 may then be attached to the empty support arm 22 and ball stake mounted as described above. A suitable blade angle for removal tool 54 has been found to be about 22° and should generally conform to the angle of bevel 50. Removal tool 54 may be more conveniently mounted in plier assembly 56 as shown in FIG. 10. Plier assembly 56 ensures that approximately equal forces are applied to both sides of mounting plate 46 at bevels 50.

Figure 11:
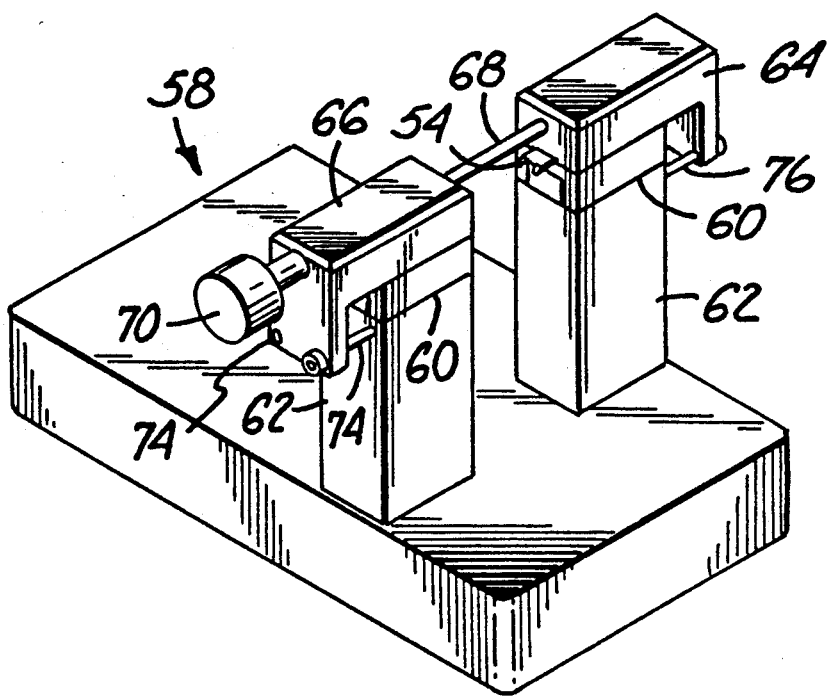
FIG. 11 shows a perspective view of an apparatus used to remove the ball stake mount.
Figure 12:
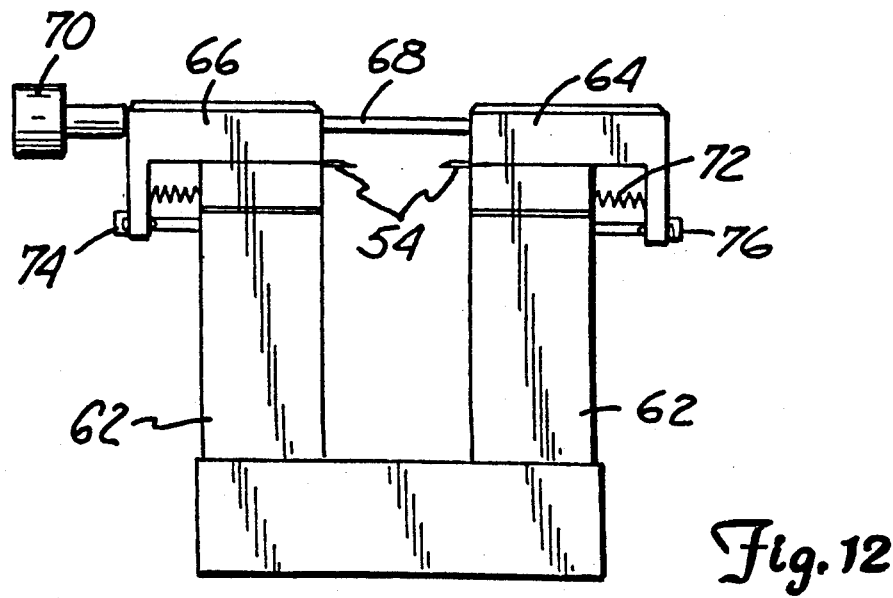
FIG. 12 shows a front elevational view of the apparatus of claim 11.

FIGS. 11 and 12 also show an apparatus 58 for removing the ball stake mount. A linear slide 60 is mounted to a pedestal 62. Mounted to the top of the slide 60 are housings 64 and 66 which hold the blades 54 in a small pocket. Running through the housings 64 and 66 is a screw 68 and handle 70. Screw 68 slides through housing 66 but threads into housing 64. As screw 68 is turned, blades 54 are drawn together until the ball stake mount pops free. The slides remain centered by the force of springs 72. Total outward movement is controlled by cap screws 74, and total inward movement by set screws 76.

Although the present invention has been described with reference to preferred embodiments, workers skilled in the art will recognize that changes may be made in form and detail without departing from the spirit and scope of the invention. For example, the bevel and removal tool may be formed in any useful shape or angle. Additionally, the bevel may be located at any position within the ball stake mount which allows separation between the ball stake mounted pieces.

What is claimed is:

1. A method for removing a magnetic transducer carrying arm from a support arm, the magnetic transducer carrying arm being ball stake mounted to the support art by a ball stake mount, the method comprising:

inserting a prying tool into tool insertion gaps the tool insertion gaps defined by opposing surfaces of the support arm and a mounting plate which is sandwiched between the support arm and the transducer carrying arm, the tool insertion gaps adapted to receive the prying tool; and applying force to the prying tool for disengaging the ball stake mount wherein the opposing surfaces receive a separation force from the prying tool to cause separation of the support arm and the transducer carrying arm.

2. The method of claim 1 wherein the mounting plate includes structure defining a bevel.

3. The method of claim 1 wherein the prying tool comprises a blade.

4. The method of claim 2 wherein the bevel has a bevel angle of about 20°.

* * * * *

UNITED STATES PATENT AND TRADEMARK OFFICE
CERTIFICATE OF CORRECTION

PATENT NO. : 5,035,044

DATED : July 30, 1991

INVENTOR(S) : Eyvand E. Toensing

It is certified that error appears in the above-identified patent and that said Letters Patent is hereby corrected as shown below:

Col. 4, line 40, delete "art", insert --arm--.

Signed and Sealed this

Twenty-ninth Day of December, 1992

*Attest:*

DOUGLAS B. COMER

*Attesting Officer*    *Acting Commissioner of Patents and Trademarks*